(No Model.) 2 Sheets—Sheet 1.

G. McCORMICK & R. T. McCLAIN.
CHECK ROW CORN PLANTER.

No. 347,362. Patented Aug. 17, 1886.

Witnesses:
Louis Hisel
W. O. Harper

Inventor:
Robert T. McClain
George McCormick (No Model.) 2 Sheets—Sheet 2.

G. McCORMICK & R. T. McCLAIN.
CHECK ROW CORN PLANTER.

No. 347,362. Patented Aug. 17, 1886.

Witnesses:
A. D. Richards.
Will S. Prewitt.

Inventor:
George McCormick
Robert T. McClain

UNITED STATES PATENT OFFICE.

GEORGE McCORMICK AND ROBERT T. McCLAIN, OF FAIRFIELD, IOWA.

CHECK-ROW CORN-PLANTER.

SPECIFICATION forming part of Letters Patent No. 347,362, dated August 17, 1886.

Application filed April 1, 1886. Serial No. 197,471. (No model.)

*To all whom it may concern:*

Be it known that we, GEORGE McCORMICK and ROBERT T. McCLAIN, of Fairfield, Jefferson county, Iowa, have invented new and useful Improvements upon a Check-Row Corn-Planter for which Richard E. Caviness and George McCormick obtained patent in the United States No. 234,243, bearing date November 9, 1880, and also for which the said Richard E. Caviness and George McCormick obtained Letters Patent No. 271,419, of date January 30, 1883, of which the following is a full, clear, and exact description.

Our invention relates to check-row corn-planters; and it consists in certain details of construction and operation of the several parts, as will be hereinafter more fully described in the specification and pointed out in the accompanying drawings, in which—

Figure 1:
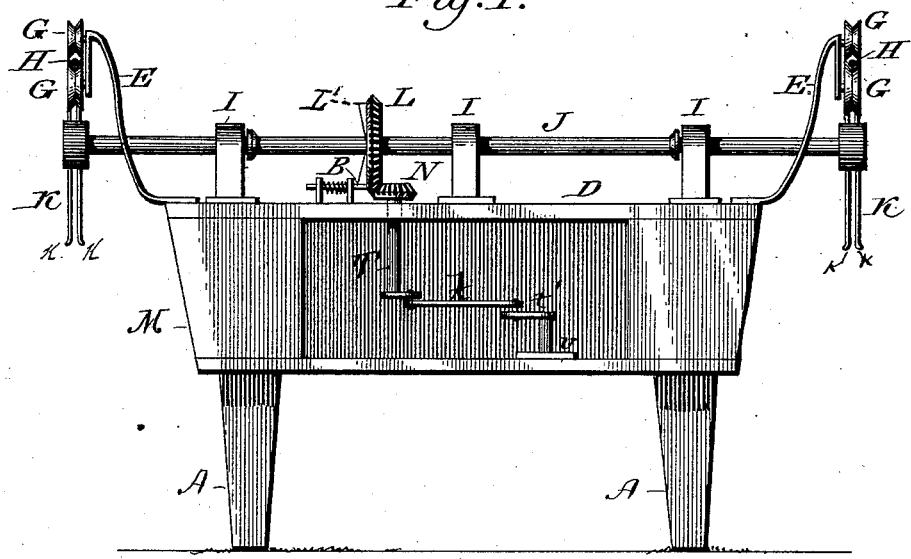
Figure 2:
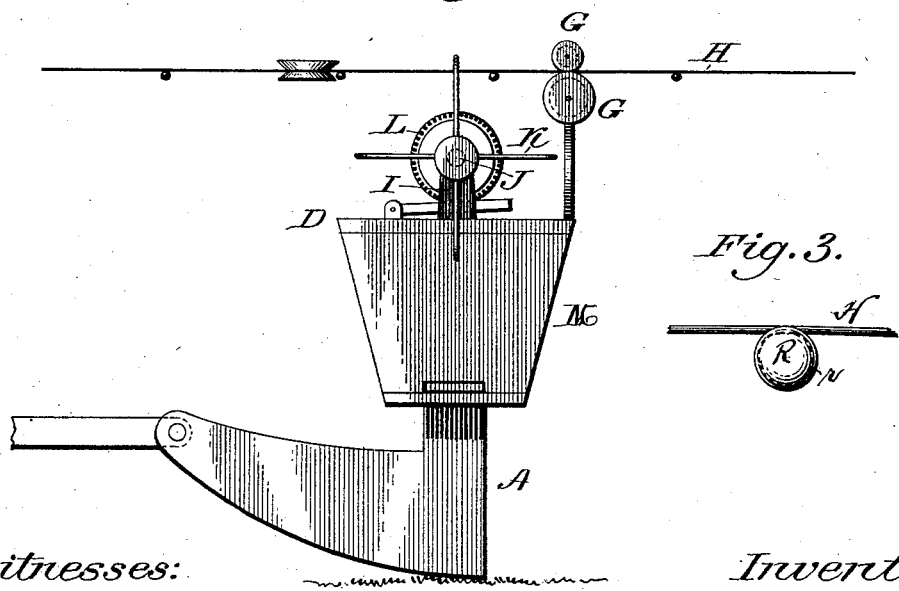
Figure 3:
Figure 4:
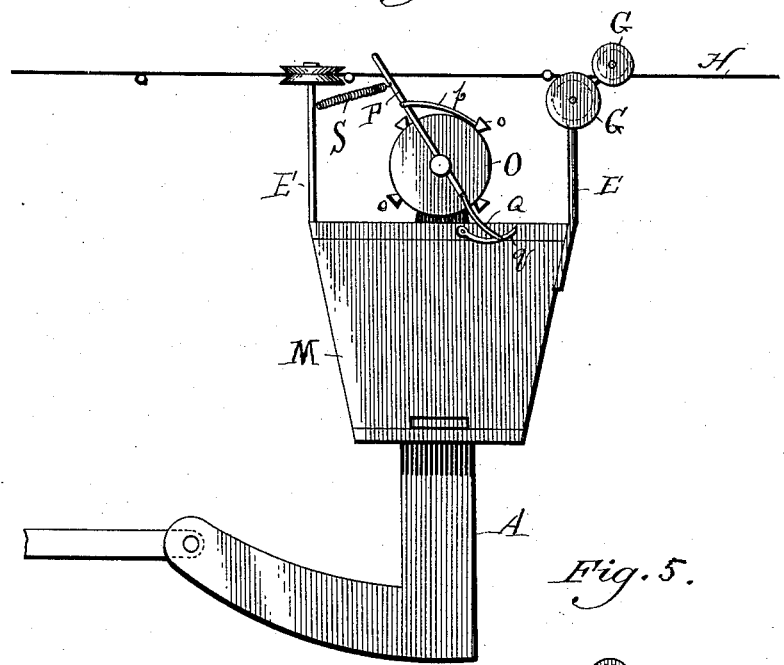
Figure 5:
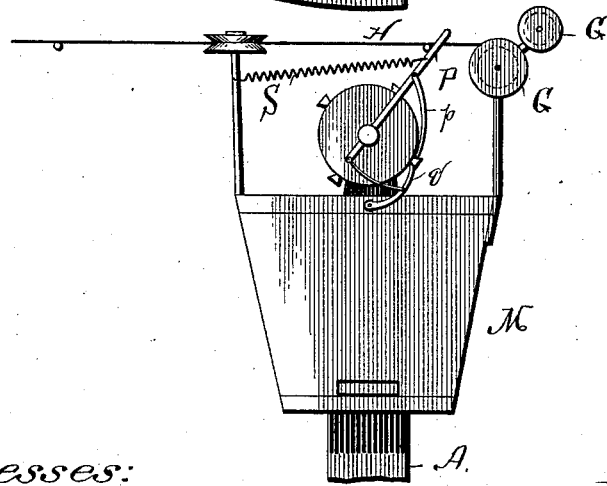

Figure 1 is an end view of the device; Fig. 2, a side elevation of same; and Fig. 3, a detail view of the ball on the chain, which operates to turn the shaft connected with the seed-dropping slide. Figs. 4 and 5 are modifications of the device for actuating the seed-dropping slide.

The object of the invention is to provide a check-row corn-planter of the kind that are operated to drop the seed by means of a line stretched across the field.

Referring more particularly to the drawings, the runners A are attached to the seed-box M, the bottom of which is provided with openings for the seed to fall to the ground, and a slide to alternately open and close said openings. A cover, D, closes the top of the seed box or receptacle M. Two or more uprights, I, are secured to the top of the box M and form bearings for a longitudinal shaft, J, the outer ends of which have arms K, made in two parts, the outer or free ends being bent outwardly, as at $k$, for a purpose which will be hereinafter explained. At the outer end of each side of the seed-box, an arm, E, rises, which is bent outwardly and upwardly, and then downwardly, as shown in Fig. 1, and has pivoted in its upper bent end two grooved pulleys, G, through which the chain H passes. This chain has secured to it at fixed intervals a ball, R, having a circumferential groove, $r$, in which the chain or wire H is bent, and is thus held firmly and securely in place. On the shaft J is placed a beveled wheel, L, which meshes with a corresponding beveled gear-wheel, N, secured to shaft T, which actuates the crank-arms $t\ t'$, and this latter actuates the slide $v$. The wheel L is provided on one side with cams L', that rest normally in contact with the spring-pressed bolt B, which prevents the knotted rope from carrying the shaft J too far after the knot has passed out of the forked arm K, thereby preventing irregularity in planting.

The operation is as follows: As the planter moves across the field, the balls R come in contact with the forked arms K, and catch in the bent ends $k$ and lift or turn the arm. This turns the shaft I, which, through the intervention of the meshing-gear L N, shaft T, and crank-arms $t\ t'$, operates the slide $v$ to open it. When this movement is completed, the slide again covers the opening in the seed-box, and is prevented from becoming accidentally displaced by the spring-pressed bolt B impinging against the cams L' on the wheel L. These balls are placed at predetermined row-intervals, and as the arms are moved, as described, the valve or slide $v$ is alternately opened and closed at these determined distances or intervals, thus giving accurate check-rows. The wire or chain H is stretched across the field in the usual manner.

We are aware that it is not broadly new for arresting the intermittent rotation of the driving-shaft after the knot has passed out of the forked arms, and hence restrict our claim to the precise construction.

Having thus described our invention, what we claim as new, and desire to secure by Letters Patent, is—

In a check-row corn-planter, the bent bar E, of the construction shown, having grooved pulleys journaled therein, in combination with operating-shaft J, carrying outwardly-bent forked arms K, gear-wheel L, provided with cam L', spring-pressed bolt B, gear-wheel N, shaft T, crank-arm $t\ t'$, and seed-slide V, all substantially as shown and described.

GEORGE McCORMICK.
ROBERT T. McCLAIN.

Witnesses:
J. B. MILLER,
M. WESTENHAVER.